Figure 1:
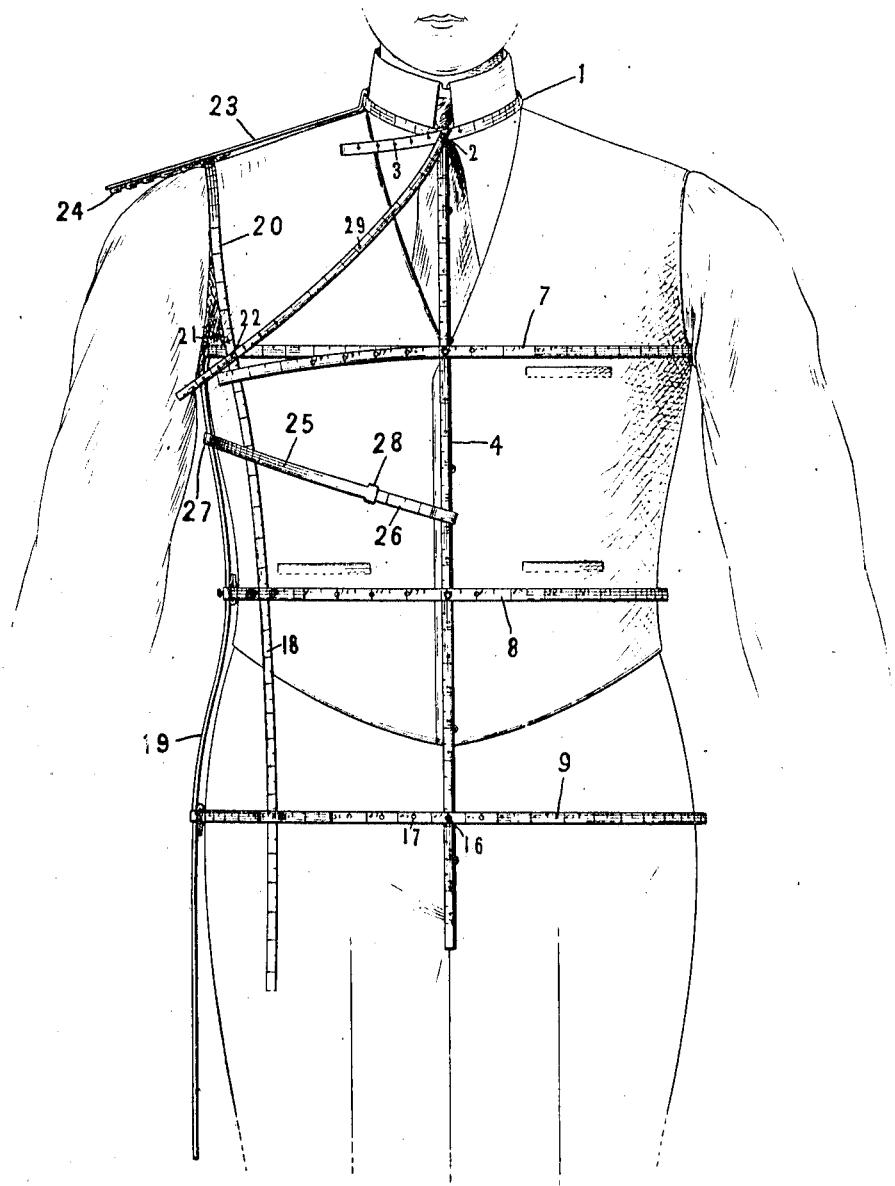

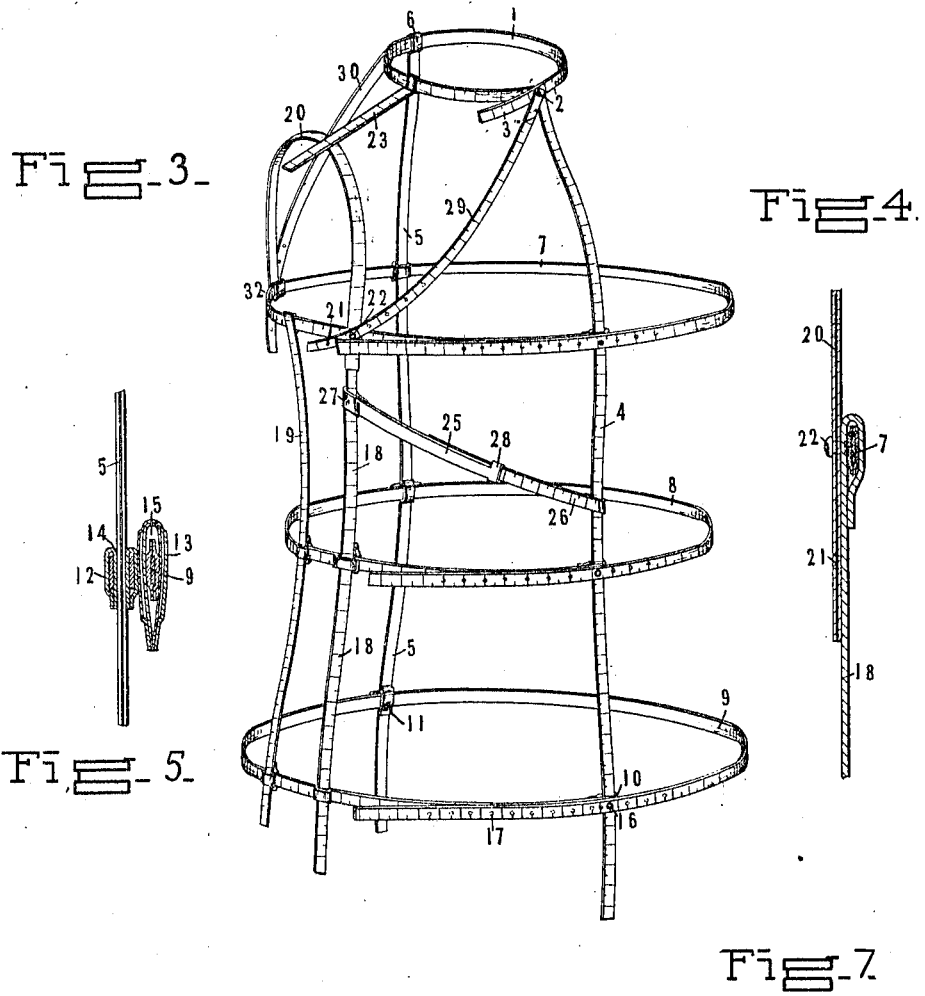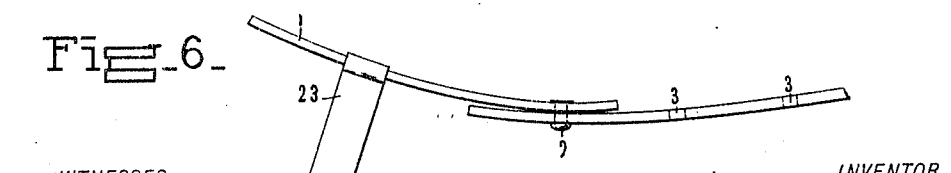

UNITED STATES PATENT OFFICE.

FRANK DE FEO, OF WATERBURY, CONNECTICUT.

MEASURING-HARNESS.

947,542.      Specification of Letters Patent.     Patented Jan. 25, 1910.

Application filed August 22, 1908. Serial No. 449,811.

*To all whom it may concern:*

Be it known that I, FRANK DE FEO, a citizen of the United States, residing at Waterbury, in the county of New Haven and State of Connecticut, have invented certain new and useful Improvements in Measuring-Harness, of which the following is a full, clear, and exact description, such as will enable others skilled in the art to which it appertains to make and use the same.

This invention relates to a measuring harness.

One of the objects is to provide a device of this character which may be easily and quickly applied to a person's body to obtain measurements therefrom to be used in the making of clothing.

Another object is to provide a device of this character which may be used by persons unskilled in the tailoring art in order that it may be used in the home by persons who may wish to make their own clothing or who may wish to send the correct measurements to a tailor.

A further object is to provide a device which will be simple in construction, inexpensive to make, and which will be accurate and reliable in operation.

Other objects will be in part obvious and in part pointed out hereinafter.

The invention accordingly consists in the features of construction, combinations of elements, and arrangement of parts, which will be exemplified in the construction hereinafter set forth, and the scope of the application of which will be indicated in the following claim.

In the accompanying drawings there is shown an illustrative embodiment of the invention, in which the reference numerals refer to similar parts throughout the several figures.

Figure 2:
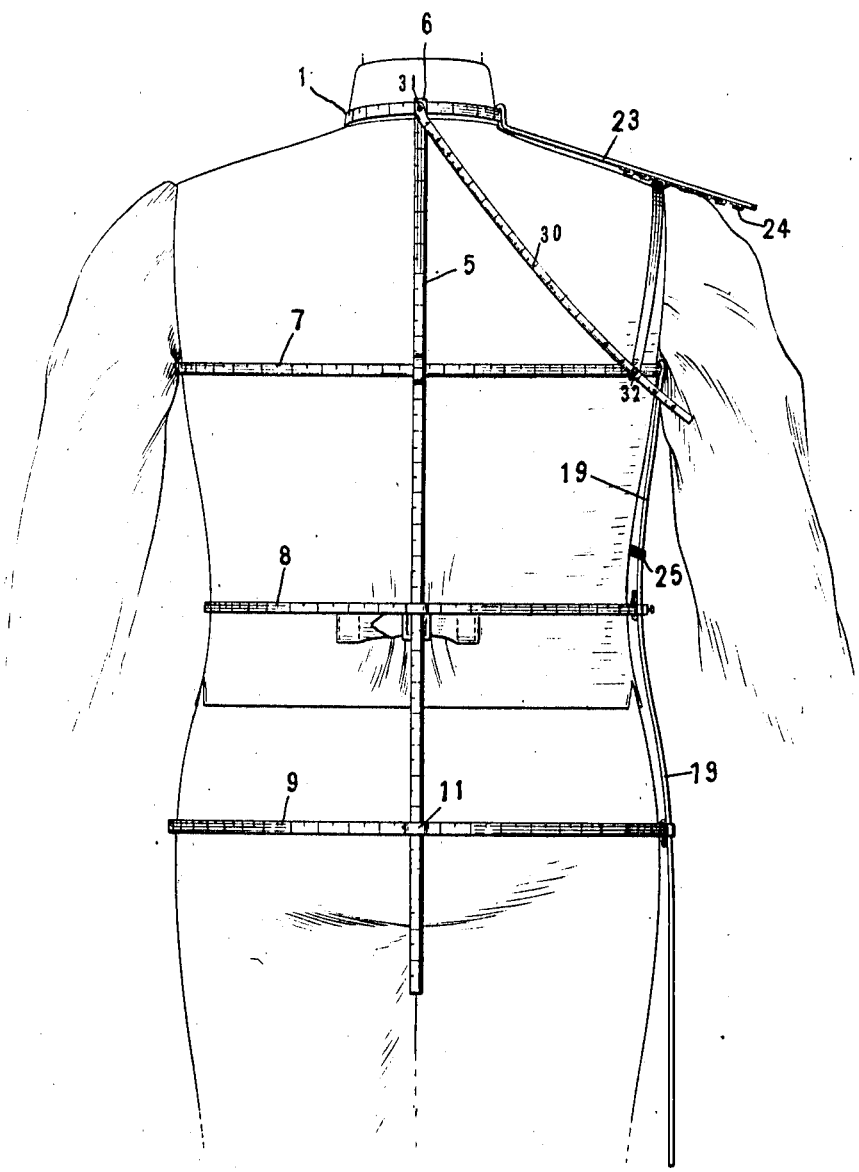

Figure 1 is a front view of my device in the position upon the body of a person. Fig. 2 is a rear view of the same. Fig. 3 is a perspective view of the same detached from the body of the wearer. Fig. 4 is a detail view showing the means of attaching the arm member to the side member. Fig. 5 is a detail sectional view showing the sliding connection between the back member and the lowermost body member. Fig. 6 is a plan view of a part of the neck member, showing the securing means; and Fig. 7 is a detail view showing the securing means associated with the lowermost body member, the front vertical member being shown in section.

Referring now to the drawings, it will be seen that the device comprises a plurality of members or straps adapted to encircle the body at different points thereof, the uppermost of said members 1 being adapted to pass around the neck. This member consists of a strap having a pin or stud 2 attached to one end thereof, and a series of holes 3 formed in its other end and adapted to engage said pin, as is clearly shown in Fig. 6. Secured to one end of the neck member 1 and depending therefrom, is a vertical front member 4, and slidingly engaging said neck member is the back member 5 provided with a loop 6 by means of which it may be adjusted with relation to said neck member. The other body members 7, 8 and 9 are adapted to pass around the chest, waist and hips of the person respectively, and as these members are similar in construction to one another, but one will be described in detail. For purposes of illustration, I will describe the lowermost of these members which is adapted to pass around the hips of the person to be measured. This member 9 consists of a strap having one end formed into a suitable loop 10 to slidingly engage the front member 4, and is provided with a sliding connection 11 for attachment to the back member 5. This sliding connection is shown as consisting of two loops 12 and 13 secured to each other, one of said loops being provided with a vertical opening 14 to receive and slide upon the back member, and the other of said loops is provided with a horizontal opening 15 to receive and slide upon said body member, by means of which construction it will be seen that the two members may be adjusted with respect to each other to any desired degree. A pin 16 is attached to one end of said strap or member 9, the other end of which is provided with a series of holes 17 adapted to engage said pin, as clearly shown in Fig. 7. It will be understood that the chest member 7 and waist member 8 are provided with similar sliding connections and fastening devices, by means of which they also may be adjusted to any desired degree.

Vertical side members 18 and 19 have one of their ends looped around the chest member 7 to provide a sliding connection therewith, and are slidingly secured to the waist and hip members by sliding connections similar to that described above. An arm member 20 is slidingly mounted upon the chest member, and its free end is provided with a series of holes 21 adapted to engage with a pin 22 which may be secured to the side member 18. Slidingly engaging the neck member is a shoulder strap 23 which may be provided with a series of hooks 24 for engagement with the arm member. Extending between the front member 4 and the side member 18 is a breast strap consisting of two portions 25 and 26, one of which has a loop 27 formed in one end sliding upon said member, and another loop 28 is formed at its other end adapted to receive the free end of the second portion of said breast member, the other end of which is provided with a loop engaging and sliding upon the front member 4, as clearly indicated in Fig. 3. A strap 29 provided with a hole in one of its ends adapted to engage the pin or stud 2 extends diagonally from the front of the neck member 1 to the point where the arm member 20 intersects the chest member 7, and its other end is provided with a series of holes adapted to engage the pin 22. A similar strap 30 provided with suitable holes extends diagonally from the pin 31 to the pin 32, as clearly shown in Fig. 2. All of these members described may have inches and fractions thereof marked upon them, as indicated in the drawings, or any other suitable units of linear measurement which may be desired.

In practice, the harness is placed upon the body of the person, as indicated in Figs. 1 and 2, the neck member being preferably the first to be secured in position snugly embracing the neck. The other body members are then adjusted to the proper height and fastened by means of the pins and holes to snugly fit around the body of the wearer at the chest, waist and hips, as shown in Figs. 1 and 2. The arm member is drawn over the upper part of the arm from the back and passed down in front thereof and secured to the side portion 18, after which the shoulder strap is adjusted to occupy its proper position with the appropriate hook engaging the arm member, as clearly shown in Figs. 1 and 2. When the harness has been properly adjusted, the numbers corresponding to the various dimensions may then be read off and noted, thus giving the exact measurements for the various dimensions required in the making of either masculine or feminine clothing.

The harness is obviously adapted to be used for the purposes of obtaining measurements necessary for making suits, dresses, shirt waists, underwear, or, in fact, any article of wearing apparel.

While I have shown the ends of the body members secured by means of studs and coacting holes, it will, of course, be understood that any suitable fastening devices may be used without in any way departing from the spirit of my invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention, and all statements of the scope of the invention which, as a matter of language, might be said to fall therebetween.

Having described my invention, what I claim as new and desire to secure by Letters Patent is:

In a device of the character described, in combination, a neck member, front and back members depending therefrom, a plurality of body members having sliding engagement with said front and back members, a plurality of side members having sliding engagement with said body members, and an arm member having one of its ends slidingly engaging the uppermost of said plurality of body members adjacent one of said side members and adapted to have its other end brought into engagement with another of said side members.

In testimony whereof I affix my signature, in the presence of two witnesses.

FRANK DE FEO.

Witnesses:
L. RUGGIERO,
FRANK PENNASIBEO.